United States Patent
Guidotti et al.

(10) Patent No.: US 11,157,831 B2
(45) Date of Patent: Oct. 26, 2021

(54) EMPATHY FOSTERING BASED ON BEHAVIORAL PATTERN MISMATCH

(71) Applicant: International Business Machines Corporation, Armonk, NY (US)

(72) Inventors: Alice Guidotti, Rome (IT); Leonardo Rosati, Rome (IT); Fabio Cerri, Rome (IT); Bernardo Pastorelli, Rome (IT)

(73) Assignee: International Business Machines Corporation, Armonk, NY (US)

(*) Notice: Subject to any disclaimer, the term of this patent is extended or adjusted under 35 U.S.C. 154(b) by 96 days.

(21) Appl. No.: 15/722,044

(22) Filed: Oct. 2, 2017

(65) Prior Publication Data
US 2019/0102696 A1 Apr. 4, 2019

(51) Int. Cl.
G06F 40/30 (2020.01)
G06N 20/00 (2019.01)
G06F 40/103 (2020.01)
G06F 40/279 (2020.01)
G06F 40/284 (2020.01)

(52) U.S. Cl.
CPC ........... *G06N 20/00* (2019.01); *G06F 40/103* (2020.01); *G06F 40/30* (2020.01); *G06F 40/279* (2020.01); *G06F 40/284* (2020.01)

(58) Field of Classification Search
CPC .. G06F 17/211; G06F 17/277; G06F 17/2785; G06F 40/30; G06F 40/103; G06F 40/279; G06F 40/284; G06N 20/00
See application file for complete search history.

(56) References Cited

U.S. PATENT DOCUMENTS

| 7,810,033 B2 | 10/2010 | Cordes et al. |
| 9,460,083 B2 | 10/2016 | Fink et al. |
| 2002/0138271 A1* | 9/2002 | Shaw ............. G10L 15/08 704/270 |

(Continued)

FOREIGN PATENT DOCUMENTS

CN 103744994 A 4/2014

OTHER PUBLICATIONS

Konrath et al., "Can Text Messages Increase Empathy and Prosocial Behavior? The Development and Initial Validation of Text to Connect", Research Article, PLOS One | DOI:10.1371/journal.pone. 0137585, Sep. 10, 2015, 27 pages.

*Primary Examiner* — Kyle R Stork
(74) *Attorney, Agent, or Firm* — Edward J. Wixted, III

(57) ABSTRACT

A cognitive system collects online behaviors of a user and an affinity group of users who are related (e.g. by relationship, or behavioral similarities) to the user. A knowledge base of behavior and sentiment patterns is produced and maintained. If real-time data for the user shifts in behavior and/or sentiment and significantly deviates from established patterns, the system looks for a similar behavior and/or sentiment pattern shift among members of the affinity group. If the affinity group patterns shift in a manner similar to the first user's pattern shift, the cognitive system, in response, updates the knowledge base with information related to the shift, thereby adding knowledge to the long-term patterns. If the cognitive system finds that the user's behavior and/or sentiment pattern shift differs significantly from the affinity group, the system generates an empathy fostering alert message and sends it to one or more recipients.

15 Claims, 8 Drawing Sheets

(56) References Cited

U.S. PATENT DOCUMENTS

| | | | | |
|---|---|---|---|---|
| 2010/0179835 A1* | 7/2010 | Wager | ............... | G06Q 10/10 |
| | | | | 705/3 |
| 2011/0125844 A1* | 5/2011 | Collier | ............... | H04L 67/12 |
| | | | | 709/204 |
| 2012/0278288 A1 | 11/2012 | Deshmukh et al. | | |
| 2014/0099614 A1 | 4/2014 | Hu et al. | | |
| 2014/0164502 A1 | 6/2014 | Khodorenko et al. | | |
| 2016/0330156 A1* | 11/2016 | Dunne | ............... | H04L 51/12 |
| 2017/0046496 A1* | 2/2017 | Johnstone | ............... | G06Q 50/01 |
| 2017/0053461 A1* | 2/2017 | Pal | ............... | G06N 7/005 |
| 2018/0082208 A1* | 3/2018 | Cormier | ............... | G06F 16/27 |
| 2019/0005841 A1* | 1/2019 | Loi | ............... | G09B 19/00 |

\* cited by examiner

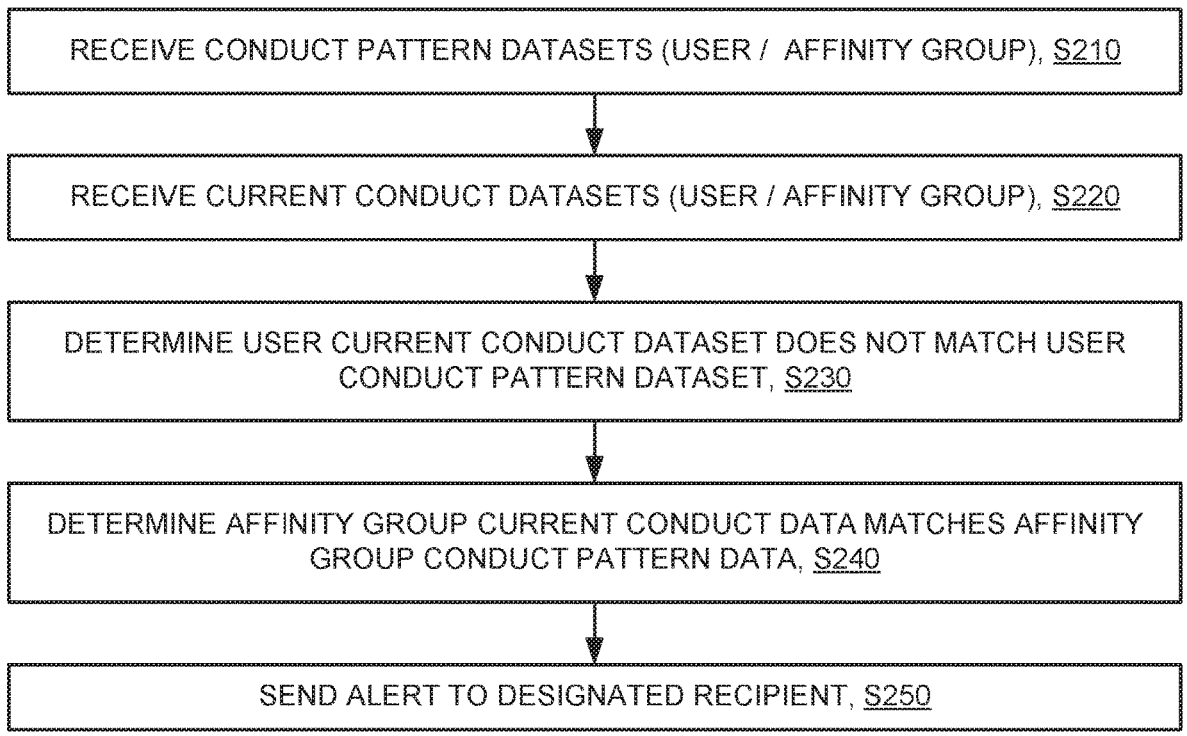
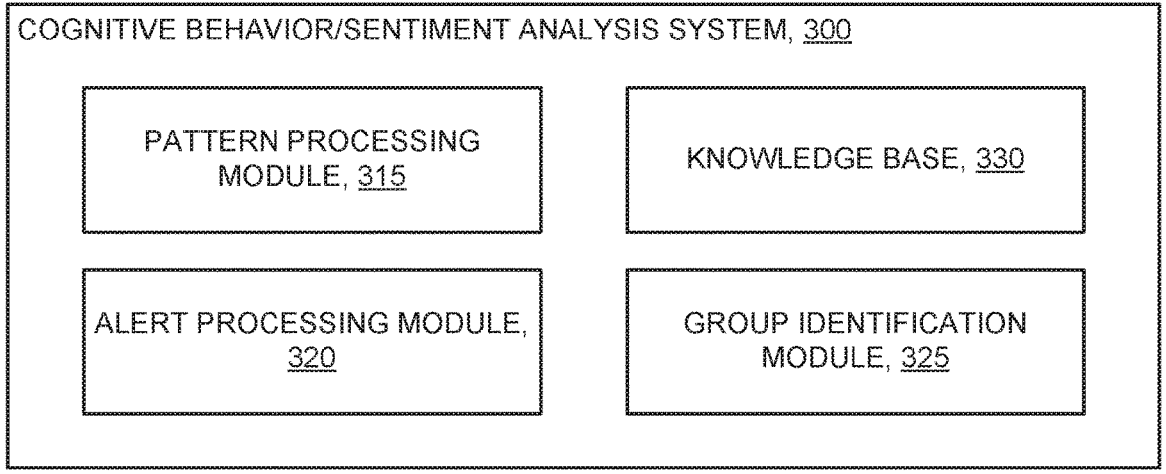

| CHANNEL | PATTERN TYPE | | VALUE | TECHNOLOGY (METRIC) |
|---|---|---|---|---|
| NON-BUSINESS SOCIAL MEDIA, 202 | POSTING ACTIVITY | | HIGH | NUMBER OF POSTS |
| | | | MEDIUM | |
| | | | LOW | |
| | POST TYPE | | FUN/FRIVOLOUS | CONCEPT TAGGING OR KEYWORD EXTRACTION SERVICES |
| | | | WORK ORIENTED | |
| | | | POLITICS | |
| | | | SOCIAL COMMITMENT | |
| | | | FAMILY | |
| | | | ANIMALS | |
| | | | TRAVEL & HOLIDAYS | |
| | POST CONTENT | | ANGRY | SENTIMENT ANALYSIS |
| | | | SAD | |
| | | | HAPPY | |
| | | | SCARED | |
| | PHOTOS ACTIVITY, 202A | | HIGH | NUMBER OF PHOTOS |
| | | | MEDIUM | |
| | | | LOW | |
| | PHOTOS SUBJECT | | SELF | IMAGE RECOGNITION |
| | | | FAMILY | |
| | | | COUPLE | |
| | | | WORK | |
| | | | TRAVEL & HOLIDAYS | |
| | SHARES CONTENT | | FUN/FRIVOLOUS | CONCEPT TAGGING OR KEYWORD EXTRACTION SERVICES |
| | | | WORK ORIENTED | |
| | | | POLITICS | |
| | | | SOCIAL COMMITMENT | |
| | | | FAMILY | |
| | | | ANIMALS | |
| | | | TRAVEL & HOLIDAYS | |

FIG. 4B

| CHANNEL | PATTERN TYPE | | VALUE | TECHNOLOGY (METRIC) |
|---|---|---|---|---|
| BUSINESS SOCIAL MEDIA, 204 | ACTIVITY | | HIGH | NUMBER OF POSTS |
| | | | MEDIUM | |
| | | | LOW | |
| | SHARES CONTENT | | OWN COMPANY | CONCEPT TAGGING OR KEYWORD EXTRACTION SERVICES |
| | | | POLITICS | |
| | | | TECHNOLOGY | |
| | | | OTHER TOPICS | |
| EMAIL, 206 | FREQUENCY TO/FROM A GIVEN PERSON; ONE LINE FOR EACH CLASSIFIED CONTACT; CLASSIFICATIONS: PARTNER, COLLEAGUE, CLOSE FRIEND, ETC. | | HIGH | PERSONS TAGGING; NUMBER OF EMAILS |
| | | | MEDIUM | |
| | | | LOW | |
| | SUBJECT | | FUN/FRIVOLOUS | CONCEPT TAGGING OR KEYWORD EXTRACTION SERVICES |
| | | | WORK ORIENTED | |
| | | | POLITICS | |
| | | | SOCIAL COMMITMENT | |
| | | | FAMILY | |
| | | | ANIMALS | |
| | | | TRAVEL & HOLIDAYS | |
| | CONTENT | | ANGRY | SENTIMENT ANALYSIS |
| | | | SAD | |
| | | | HAPPY | |
| | | | SCARED | |

FIG. 4C

| CHANNEL | PATTERN TYPE | | VALUE | TECHNOLOGY (METRIC) |
|---|---|---|---|---|
| CHAT CONVERSATION, 208 | FREQUENCY TO/FROM A GIVEN PERSON; ONE LINE FOR EACH CLASSIFIED CONTACT; CLASSIFICATIONS: PARTNER, COLLEAGUE, CLOSE FRIEND, ETC. | | HIGH | PERSONS TAGGING; NUMBER OF CHAT MESSAGES |
| | | | MEDIUM | |
| | | | LOW | |
| | CONTENT | | ANGRY | SENTIMENT ANALYSIS |
| | | | SAD | |
| | | | HAPPY | |
| | | | SCARED | |
| | SHARED PICTURES | | SELF | IMAGE RECOGNITION |
| | | | FAMILY | |
| | | | COUPLE | |
| | | | WORK | |
| | | | TRAVEL & HOLIDAYS | |
| GPS LOCATION, 210 | WORK LOCATION VARIABILITY | | MAP, LOCATION/TIME TUPLES, ETC. | GPS LOCATION DURING WORK HOURS |
| | OFF-WORK LOCATION VARIABILITY | | MAP, LOCATION/TIME TUPLES, ETC. | GPS LOCATION DURING NON-WORK HOURS |

FIG. 4D

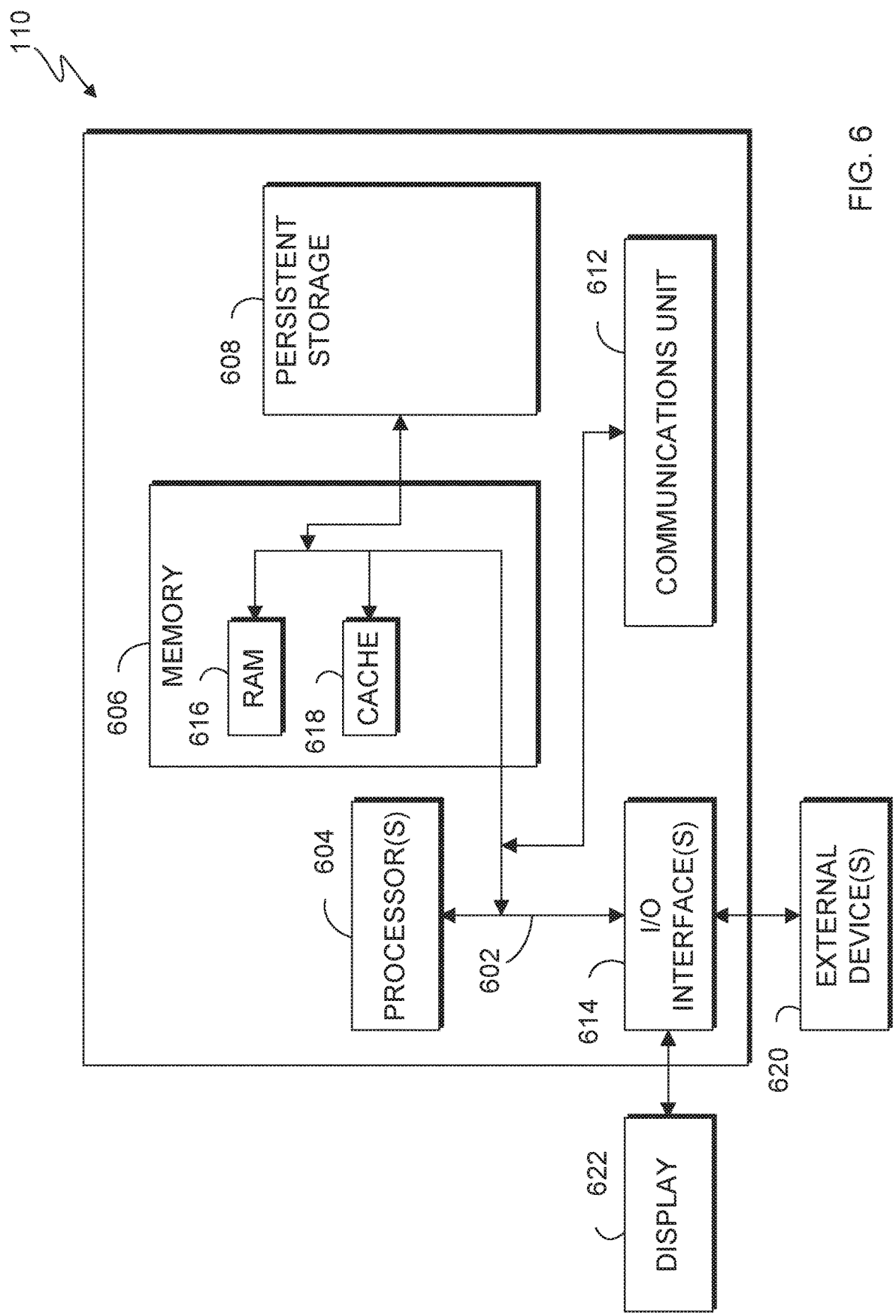

EMPATHY FOSTERING BASED ON BEHAVIORAL PATTERN MISMATCH

BACKGROUND OF THE INVENTION

The present invention relates generally to the field of cognitive computing, and more particularly to sentiment analysis applied to online social networking activity.

The advent of widespread use of smartphones and social networks tends to alienate people and decrease their "in-person" face-to-face interactions. Even sender-to-recipient (or point-to-point communications, email, for example) written communication is decreasing. People increasingly tend to multi-cast using social network posts. Moreover, friends' posts can be overwhelming in volume, especially for those people who are very connected. Particular behaviors tend to be unnoticed in the plethora of information received on a daily basis. Although friendships may seem to be widespread, reachable and able to overcome distance barriers, some of these friendships may become superficial and distant.

SUMMARY

According to an aspect of the present invention, there is a method, computer program product and/or system that performs the following operations (not necessarily in the following order): (i) receiving a user conduct pattern dataset with respect to a user; (ii) receiving an affinity group conduct pattern dataset with respect to an affinity group, where the user is a member of the affinity group; (iii) receiving a user current conduct dataset with respect to the user; (iv) receiving an affinity group current conduct dataset with respect to the affinity group; (v) determining: (a) the user current conduct dataset does not match the user conduct pattern dataset, and (b) the affinity group current conduct dataset matches the affinity group conduct pattern dataset; (vi) in response to determining (a) and (b) above, producing an empathy alert; and (vii) sending the empathy alert to a designated recipient.

BRIEF DESCRIPTION OF THE DRAWINGS

FIG. 2 is a flowchart depicting one example of a method, performed at least in part, by a system in accordance with at least one embodiment of the present invention;

FIG. 3 is a block diagram depicting one example of a machine logic (for example, software) portion of a cognitive behavior/sentiment analysis system in accordance with at least one embodiment of the present invention;

FIG. 4B is a table depicting one example of a first portion of a knowledge base in accordance with at least one embodiment of the present invention;

FIG. 4C is a table depicting one example of a second portion of a knowledge base in accordance with at least one embodiment of the present invention;

FIG. 4D is a table depicting one example of a third portion of a knowledge base in accordance with at least one embodiment of the present invention;

FIG. 6 is a block diagram depicting components of one example of a computer, in accordance with at least one embodiment of the present invention.

DETAILED DESCRIPTION

In some embodiments of the present invention, a cognitive system collects data related to online behaviors of a user and of a group of users who are related in some way to the user (referred to as an affinity group), to establish a knowledge base of individual and group behavior and sentiment patterns. If real-time data for the user exhibits a shift in behavior and/or sentiment that significantly deviates from established patterns, the system looks for a similar behavior and/or sentiment pattern shift(s) among members of the affinity group. If the system finds that the affinity group patterns, in aggregate, shift in a manner similar to the user's pattern shift, the cognitive system, in response, updates the knowledge base with information related to the shift, thereby adding knowledge to the long-term patterns. However, if the cognitive system finds that the user's behavior and/or sentiment pattern shift differs significantly from the affinity group's (for example, the group does not exhibit a shift at all, in behavior or sentiment), the system generates an empathy fostering alert message and sends the message to one or more designated recipients.

The present invention will now be described in detail with reference to the Figures.

Figure 1:
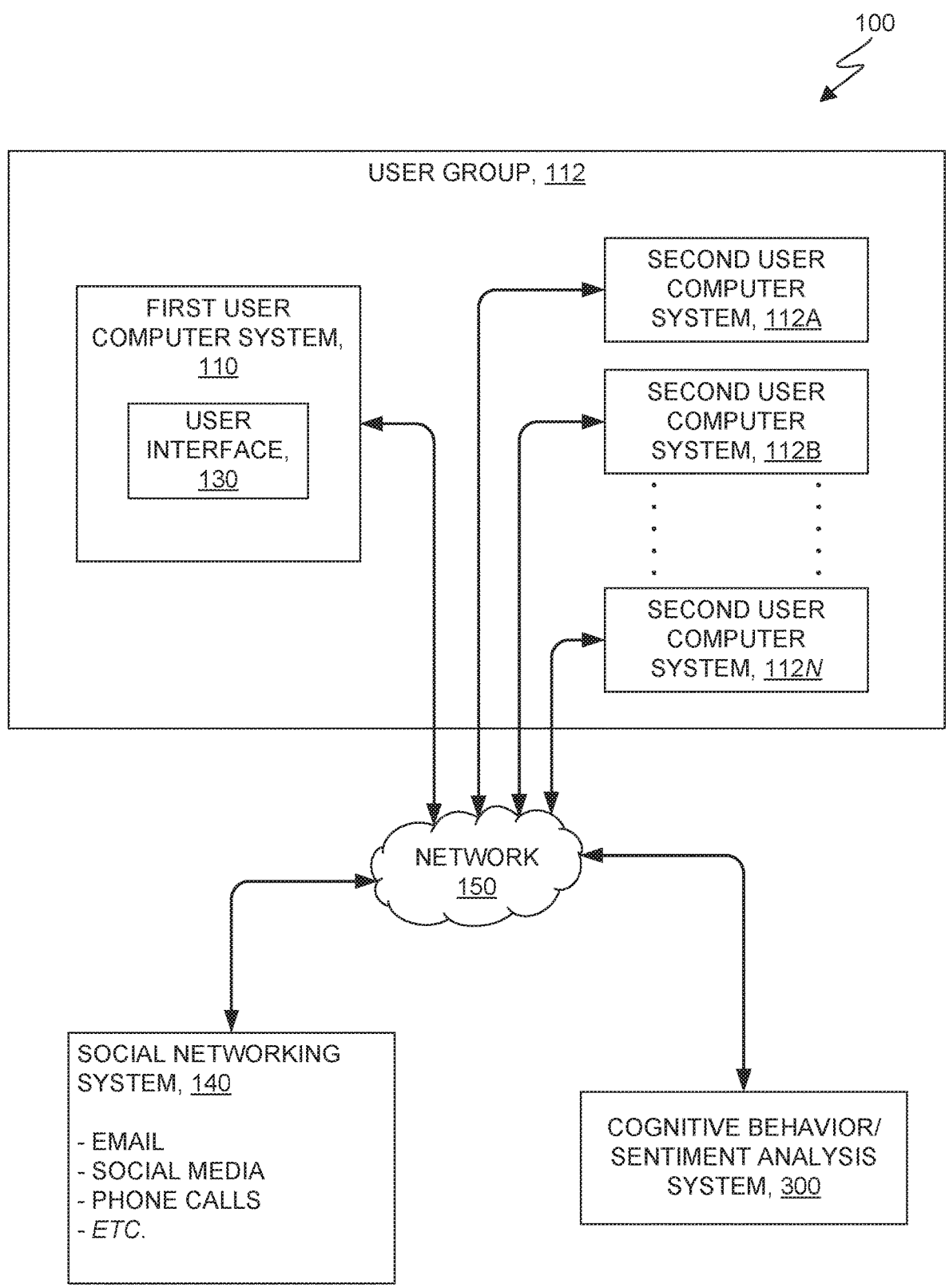
FIG. 1 is a functional block diagram depicting one example of a computing environment in accordance with at least one embodiment of the present invention.

FIG. 1 is a functional block diagram depicting one example of a computing environment 100 in accordance with an embodiment of the present invention. Computing environment 100 includes: first user computer system 110; user group 112; any number of second user computer systems 112A, and 112B-112N; user interface 130; social networking system 140; network 150; and cognitive behavior/sentiment analysis system 300. First user computer system 110 can be any of a desktop computer, a laptop computer, a specialized computer server, or any other computer system known in the art. In some embodiments, first user computer system 110 represents a computer system utilizing clustered computers and components to act as a single pool of seamless resources when accessed through network 150. In general, first user computer system 110 is representative of any electronic device, or combination of electronic devices, capable of executing machine-readable program instructions, as described in greater detail with regard to FIG. 6.

FIG. 2 shows flowchart 200 depicting one example of a method according to the present invention. FIG. 3 shows one example of a cognitive behavior/sentiment analysis system 300 for performing at least some of the method operations of flowchart 200. This method and associated software will now be discussed, over the course of the following paragraphs, with extensive reference to FIG. 2 (for the method operation blocks) and FIG. 3 (for the software blocks).

Processing begins at operation S210, where cognitive behavior/sentiment analysis system 300, receives user activity data generated through user interactions with one or more communication channels. Communication channels include social networking interactions such as online chats, social network postings, photo tagging, file uploads and downloads, emails sent and received, calendar updates, voice over internet protocol (VOIP) phone calls, etc. Each of these channels is a potential source of user activity data. Cognitive behavior/sentiment analysis system 300 receives this data as users interact online with other users.

Based on data in knowledge base 330, pattern processing module 315, of cognitive behavior/sentiment analysis system 300, identifies long-term and current (short-term) behavior and sentiment patterns pertaining to users for which data resides in the knowledge base. Long-term patterns are identified, based on data collected over a configurable length of time (for example a rolling one-year time window), or accumulated over a time span beginning at system implementation and ending at any given time, such as the present time. Current patterns are identified based on data collected over a relatively brief rolling time window typically ending at the present time. In some embodiments, the relatively brief rolling time window is one week long. In other embodiments, the time relatively brief rolling time window is one hour long. Any lengths of time can be configured for the long-term and current time windows.

Group identification module 325, of cognitive behavior/sentiment analysis system 300, identifies one or more sets of users, each set called a group (sometimes referred to as an affinity group), the members of which share at least some characteristics with a given user. For example, with regard to a given user, say "User-A", the group identification module may identify an affinity group comprising all users in knowledge base 330 who are found to be coworkers of User-A. Another group may comprise members of the User-A's family. Yet another group may comprise members of an interest group to which User-A is a member. Still another group may comprise persons who share the same political persuasion as does User-A. Cognitive behavior/sentiment analysis system 300 may automatically identify group members relating to User-A in some way. Alternatively, User-A may designate certain users as belonging to a particular group. Group members may be selected by any combination of: (i) automatic identification by the cognitive system, for example through cognitive analysis of users' online activities; (ii) designation by User-A; (iii) acceptance of a request, that is made by a user, to be included in a group related to User-A; and/or (iv) any combination of the foregoing.

Processing proceeds at operation S230, where pattern processing module 315, of cognitive behavior/sentiment analysis system 300, detects that a user (in the present example embodiment, User-A) exhibits a current behavior or sentiment that deviates from a behavior or sentiment that reasonably would be expected, based on User-A's long term behavior/sentiment patterns.

Processing proceeds at operation S240, where pattern processing module 315, of cognitive behavior/sentiment analysis system 300, in response to the deviation detected in operation S240 above, determines that a relevant group's current behavior/sentiment patterns, on the whole, do not deviate from long term patterns in a time frame corresponding to the deviation in User-A's pattern.

Processing proceeds at operation S250, where in response to determining that there is no deviation in group behavior (determined in operation S250 above) commensurate with the deviation in User-A's behavior (determined in operation S240 above), alert processing module 320 prepares an alert message and sends the message to one or more designated recipients. This will be discussed in further detail below in the section Further Comments and/or Embodiments.

FURTHER COMMENTS AND/OR EMBODIMENTS

In the online world of social networking, a user may have relationships with many other users. Types of relationships may be grouped into categories such as family, co-workers, various levels of friends (ranging from close friends known personally, to distant "friends" known only through online communications), followers, etc. Each group of users is referred to as an affinity group. A user may belong to more than one affinity group, where each affinity group exhibits its own behavior patterns. Online interactions between a user and members of an affinity group may involve one or more communication channels, such as chats, social network interactions, email, phone calls, etc. Each of these channels provides a source of data that may be stored in a knowledge base, and processed by a cognitive system. In some embodiments of the present invention, the cognitive system analyzes this data to uncover individual and affinity group behavioral patterns, and sentiment scores and deviations thereof (for example, sentiment gradients, that is a rate of change of a sentiment score). The cognitive system then works out whether a user's deviations are explainable or not (due to known causative factors), and whether or not to: (i) issue empathy alert(s) to one or more recipients in response to changes in the user's behavioral pattern or sentiment score; and (ii) update the knowledge base, based on the user's anomalous behavior.

A change in input patterns, for example an unusual lack of input from a user who frequently provides regular input, may be highly valuable information. Consider for instance a user who has a particular online friend, where the friend is very communicative and generally writes funny jokes. The friend tends to frequently share posts from other connections, and tends to use smiley faces in reply emails and text messages with others. The user might not notice that the friend has recently begun posting less often and is no longer adding funny posts or smiley faces. In some embodiments of the present invention, the cognitive system detects unexpected changes in the friend's behavior and sentiment score. In response, the cognitive system sends an empathy alert to the user, calling attention to the friend's unusual behavior. The alert is designed to evoke empathy for the friend, and perhaps prompt the user to explore reasons for the shift and possibly inquire, offer assistance, counseling, or a sympathetic listening ear to the friend.

On the other hand, consider a user who is a member of a politically oriented affinity group. The group's preferred candidate loses an election. The sentiment score for the user drops suddenly in response. The sentiment score for the affinity group likewise drops suddenly. Given the determination that the sentiment scores for the user and the affinity group have similar gradients (similar in direction and rate of change), the cognitive system does not issue an empathy alert because the shift is caused by an external factor, and is not isolated to just the user alone. The cognitive system may update the knowledge base with information related to the recent event and user (and affinity group members) response thereto. The information that may become useful in responding to similar incidents in the future.

However, suppose that the affinity group's preferred candidate wins the election, and as a result the group's sentiment score rises, yet the user's sentiment score drops. The cognitive system observes this mismatch, and issues an empathy alert to a designated recipient. It may turn out that coincident with the election, the user has lost a cherished heirloom. The designated recipient who receives the empathy alert may be prompted by the alert to make contact with the user and offer appropriate human support.

The cognitive system applies similar analysis and response logic with respect to a user's behavior patterns vis-à-vis an affinity group's behavior patterns.

Some embodiments of the present invention are comprised of two main components: (i) behavior/sentiment analysis (cognitive analysis of users' behaviors and sentiments to extract useful data and identify established behavioral and sentiment patterns); and (ii) pattern mismatch recognition (sometimes herein referred to as pattern deviation), in which the cognitive system compares users' recent patterns with longer-term patterns to uncover behavior and/or sentiments that are not reasonably to be expected based on the established patterns. These two components will be discussed in the following few paragraphs.

Behavior/sentiment analysis: The behavior/sentiment analysis takes into consideration the behaviors and sentiments of a user, by analyzing several sources of information. In some embodiments, authorization is sought and granted as a pre-requisite to collecting some or all of the following input data. Sources of information used by the cognitive system for analysis include: (i) social network activities (posts, connections, frequency, subjects, shares, pictures, videos, and games); (ii) emails (subjects, receivers, senders); phone calls (callers, receivers, frequency, duration); (iii) chats (contents (text, length), emoticons, contacts); (iv) calendar (entries, work site holidays, meeting topics; (v) output from sentiment analysis processing; and/or (vi) location (global positioning system (GPS), WiFi and cell tower communications).

Moreover, the cognitive system learns by comparing behaviors and sentiments and changes thereof, across a complete set of related users (an affinity group), to discover patterns and learn from received feedback. A knowledge base maintains the input data and detected behavioral/sentiment patterns for members of the affinity group.

Pattern mismatch recognition: The cognitive system monitors the users behavior and/or sentiment patterns, and checks for behavioral changes. For example, if a user who regularly and frequently makes posts on a social media site suddenly stops posting, the change may indicate a significant behavioral change. Another user may not notice this indicator, because of the large amount of postings on social networks by numerous other contacts.

After detecting a behavioral change, the system starts a process aimed at understanding whether the change is abnormal or explicable, by analyzing changes in other monitored variables. For example the system may have discovered, by analyzing input from other users, that travel to a certain geographical location has the consequence of reduced access to social networks. The system may have learned this by analyzing the behavior of other users, or by having received feedback when notifying other users. For instance, the cognitive system alerts User-A that User-B has stopped posting; User-A responds to the system that User-B has intentionally gone "off the grid" for a relaxing island vacation. In this situation, the system has acquired information by the lack of data (lack of posts on a social network) in conjunction with user feedback. In some embodiments, the feedback is either direct (as in the foregoing example) or not, and acquired by analyzing subsequent behaviors, with particular attention to the interaction between the user and the alerted party.

In some embodiments of the present invention, an authorization database (FIG. 4A, 162) stores user-configurable authorizations that permit, restrict, or deny the use of various sources of information—only aggregated data is disclosed (for example, to alerted users), while confidential information (for example, information for which a user has not given permission to disclose) is not.

Further, in some embodiments of the present invention, the system discovers (or requests and is explicitly given) a set of recipients to which a particular user would like to send alerts, and from which set of users the particular user would like to receive alerts. This may be discovered by analyzing the interactions (frequency, duration, etc.), and information such as relationship status (close friends, family members, etc.).

In some embodiments of the present invention, a cognitive system receives input data. Based on the data, the system learns, observes and analyzes the behaviors, produces alerts and sends them to users, and then learns again from new data and from the feedback received from users in response to alerts, in a continual learning and processing loop.

In some embodiments of the present invention, the cognitive system produces the knowledge base in the following way. For each user, the knowledge base includes multiple entries, where each entry contains at least the following information: (i) channel (source of information, such as social networks, email accounts, chat conversations, calendar, locations, etc.); (ii) pattern type (type of pattern that is being recorded; (iii) value(s) associated with a given pattern; (iv) priority (importance of a given pattern for a given user, meaning how much information exists with respect to the pattern); and/or (v) end date (associated with temporary patterns that are used to identify temporary user behaviors).

Figure 4A:
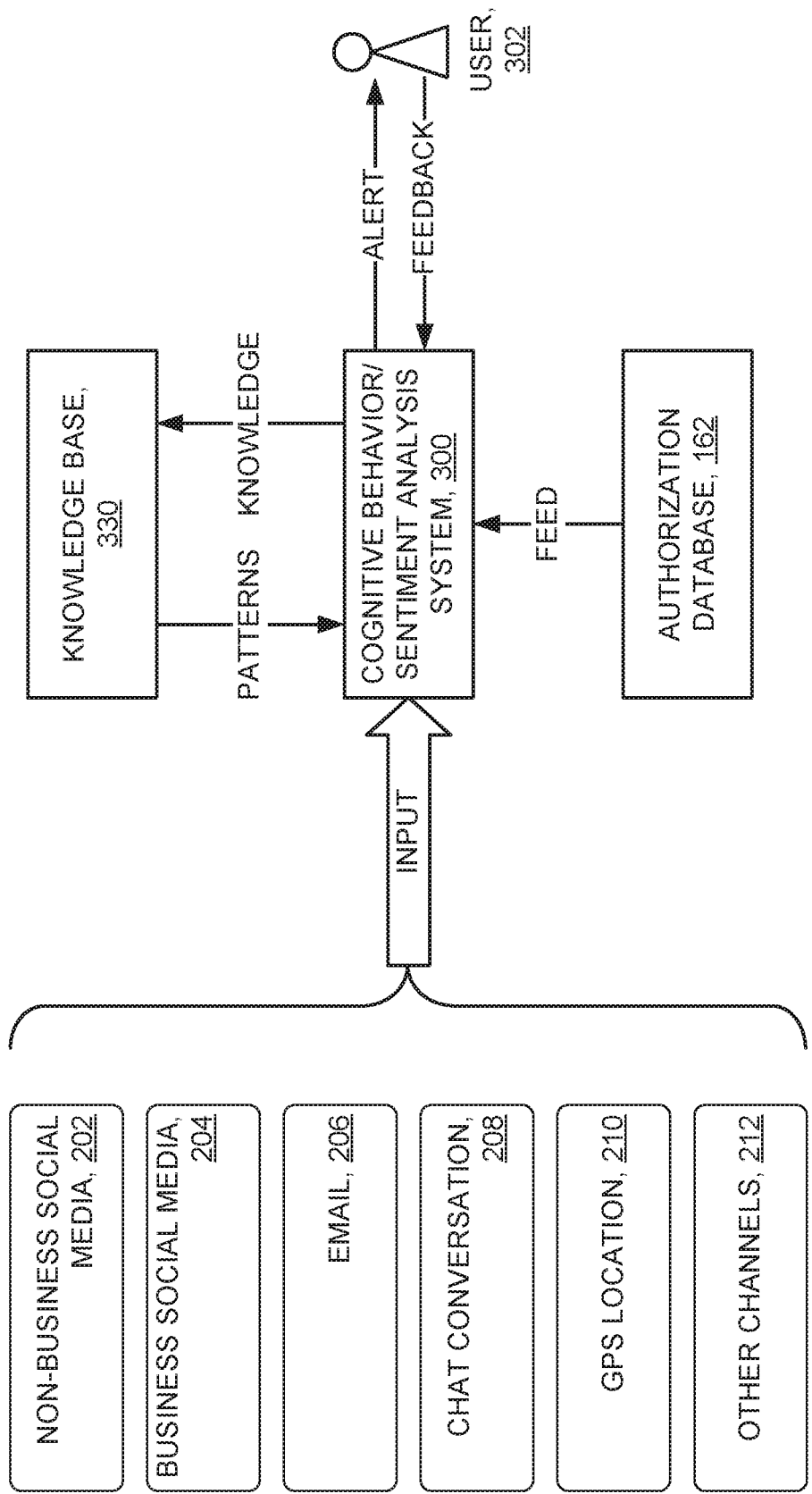
FIG. 4A is a high-level data flow diagram of one example of a system in accordance with at least one embodiment of the present invention.

FIG. 4A is a high-level data flow diagram of one example of a system in accordance with at least one embodiment of the present invention. Channels include: non-business social media 202; business social media 204; email 206; chat conversation 208; GPS location 210; and other channels 212. Information from the channels flows into cognitive behavior/sentiment analysis system 300. The cognitive behavior/sentiment analysis system further: (i) receives information from authorization database 162; sends and receives information from at least one user 302; sends information (developed knowledge) to knowledge base 330; and receives information (including pattern data) from the knowledge base.

Some pattern types, values, and technologies (sometimes herein referred to as metrics) associated with information that may be derived from these channels are shown in FIG. 4B (non-business social media 202), FIG. 4C (business social media 204, and email 206), and FIG. 4D (chat conversation 208, and GPS location 210). It is noted here that the channels, pattern types, values and metrics shown in FIGS. 4A-4D are merely examples, and are not limiting. That is, knowledge base 330, in some embodiments, may include information received from other channels, may track other pattern types, and may have other possible values and metrics (technologies) than those discussed here and shown in the Figures.

With respect to GPS location 210, (FIG. 4D), and in the context of "Work location variability" or "Off-work location variability"—in some embodiments of the present invention, location and movement pattern are stored as a series of tuples, for example [location|date|time|duration|velocity]. Alternatively, the information may include any other type of data from which can be worked out the location and movement of the object being tracked during a specified period of time (in the present context, respectively during a user's working or non-working hours). In some embodiments, a location and movement pattern can be presented visually, for example by overlaying the movement pattern on a map of the relevant area, or by presenting any other type of meaningful graph.

In some embodiments of the present invention, a complete format of the knowledge base for a single user includes the following:

[User|Channel-1|PatternType-1|Value-1|Priority-1|EndDate-1| . . . |Channel-n|PatternType-n|Value-n|Priority-n|EndDate-n|GPSLocation|CalendarEvents]

In some embodiments of the present invention, the knowledge base further includes a set of user groups such as:

1. Set of defining patterns: a set of tuples, for example: [channel|pattern|type|value] that are considered as characteristics of a user group (takes into consideration only high priority behaviors).

2. Members: a set of users who exhibit the above values for their behaviors. A user can only be member of a set.

The users are thus grouped based on their behaviors, to discover group patterns and deviations from the patterns.

Some embodiments of the present invention include a processing algorithm comprising at least two phases: (1) building the knowledge base; and (2) monitoring behavior and sentiments. These phases are discussed below in the following few paragraphs.

Phase 1. Building the Knowledge Base

The initial phase of the algorithm is intended to build and populate the knowledge base. For each user, the algorithm analyzes the user's social networks, e-mails and chats over a configurable period of time. The algorithm performs the following operations:

Within each channel (social network, e-mail, chat, etc.— see FIG. 4A), and for each pattern therein:

(i) The algorithm collects relevant user interactions matching the "Pattern type" across all the social stream corresponding to the "Channel" over the last n days. (n days is a configurable amount of time, that can be tuned based on experimental and/or experiential data.)

For example, for a channel (such as non-business social media 202 (FIG. 4B) and a pattern type (such as photos activity 202A (FIG. 4B), the algorithm collects all the photos processed (submitted/shared/viewed/deleted/tagged/commented on, etc.) by the user, across all the social networks of the user.

(ii) The algorithm applies, to the collected data (in this example, the collected photos), the corresponding technology engine as described in the tables of FIGS. 4B-4D. The engine returns a value (in this example, a count of the number of photos).

(iii) The algorithm computes a priority, based on the amount of data collected at step (i) in comparison to all the data shared by the user over all the social channels. This metric defines how relevant the "Channel-Pattern Type" pair (in this example, non-business social media—photos activity) is for the user.

(iv) The algorithm adds to the knowledge base an entry using the data computed above, and sets the end date to an empty value, indicating that this is the primary behavior. If a behavior is determined to be temporary behavior, the algorithm adds a date value to the end date field. The date value indicates that the behavior is temporary, lasting up to the end date, and thereafter discarded or omitted from consideration for pattern development or pattern matching operations.

The resulting knowledge base entries provide a "fingerprint" or in other words, discover a set of behavior patterns for each user.

Phase 2. Monitoring Behavior and Sentiments

The second phase of the algorithm groups users based on common patterns. The algorithm identifies groups of users based on various factors stored in the knowledge base. The resulting groups are called "affinity groups" in that there is some affinity between members of the group and a particular user. In some embodiments of the present invention, values of users' patterns are based mainly on the users location and the values of the other channels.

In some embodiments, the algorithm groups together certain users based on similarities in the users' high-level behavior patterns discovered in the knowledge base. This approach allows a distinction to be drawn between an individual user behavior deviation and a group behavior deviation.

After the initial ramp up (see Phase 1. Building the knowledge base above), the system starts analyzing real time behaviors. The cognitive system periodically reapplies the same algorithm used for creating the knowledge base. It calculates pattern values at the current time, for instance by analyzing the information of the last week, the last hour, or any other configurable timeframe.

The algorithm performs the following operations:

For each user, the algorithm gathers the same types of data used for computing the knowledge base, but on a shorter and most recent time interval (for example the most recent week).

The algorithm computes the number of pairs "Channel-Pattern Type" that have values different from the values that are in the knowledge base (either persistent or temporary differences). For discussion, this will be called the number of anomalous behaviors associated with User-A.

If the number of anomalous behaviors for User-A exceeds a given (configurable) threshold, the algorithm seeks out other users, in User-A's affinity group, who exhibit similar values for the anomalous behaviors. For discussion, this is called the number of anomalous users, or in other words, the set of users who exhibit the same (or similar) anomalous behaviors as does User-A.

If the number of anomalous users in User-A's affinity group exceeds a configurable threshold proportion of the total number of members in the affinity group, the algorithm considers the anomalous behavior to be a normal deviation (for example, a deviation brought about by an event such as a political election, or a vacation period, etc.). The algorithm takes no actions in response.

If the number of anomalous users in User-A's group does not exceed the configurable threshold proportion of the total number of members in the User-A's group, the algorithm: (i) checks User-A's location and compares it to User-A's location pattern in the knowledge base; and (ii) checks the calendar to understand if a change occurred with respect to the previous period (for example, work-related email activity patterns might be set to "Low" during site holidays). If no major change occurred either to the location or calendar, the algorithm notifies a configurable set of recipient(s) (for example a friend or family member) that User-A has exhibited the unusual behavior.

The algorithm updates the knowledge base using the newly computed values as a reconciliation of the old values, updated with the new values. The result is the same as if the knowledge base had been built to include the current data, instead of at the end of the previous period.

The algorithm checks for any user provided feedback, and creates temporary entries based on the users feedback. For instance, if social network contents vary from happy to sad, the system identifies the change in sentiment. If the change in sentiment occurs for just an isolated user, the algorithm notifies one or more designated recipients of the change. The designated recipients may be friends, co-workers, or others designated by the user to receive such alerts. If the change from happy to sad applies to a threshold number of relevant users (users in the same group), the algorithm concludes that the change for multiple users was triggered by an external event. In some embodiments of the present invention, the algorithm does not issue any notifications in such a case.

Figure 5:
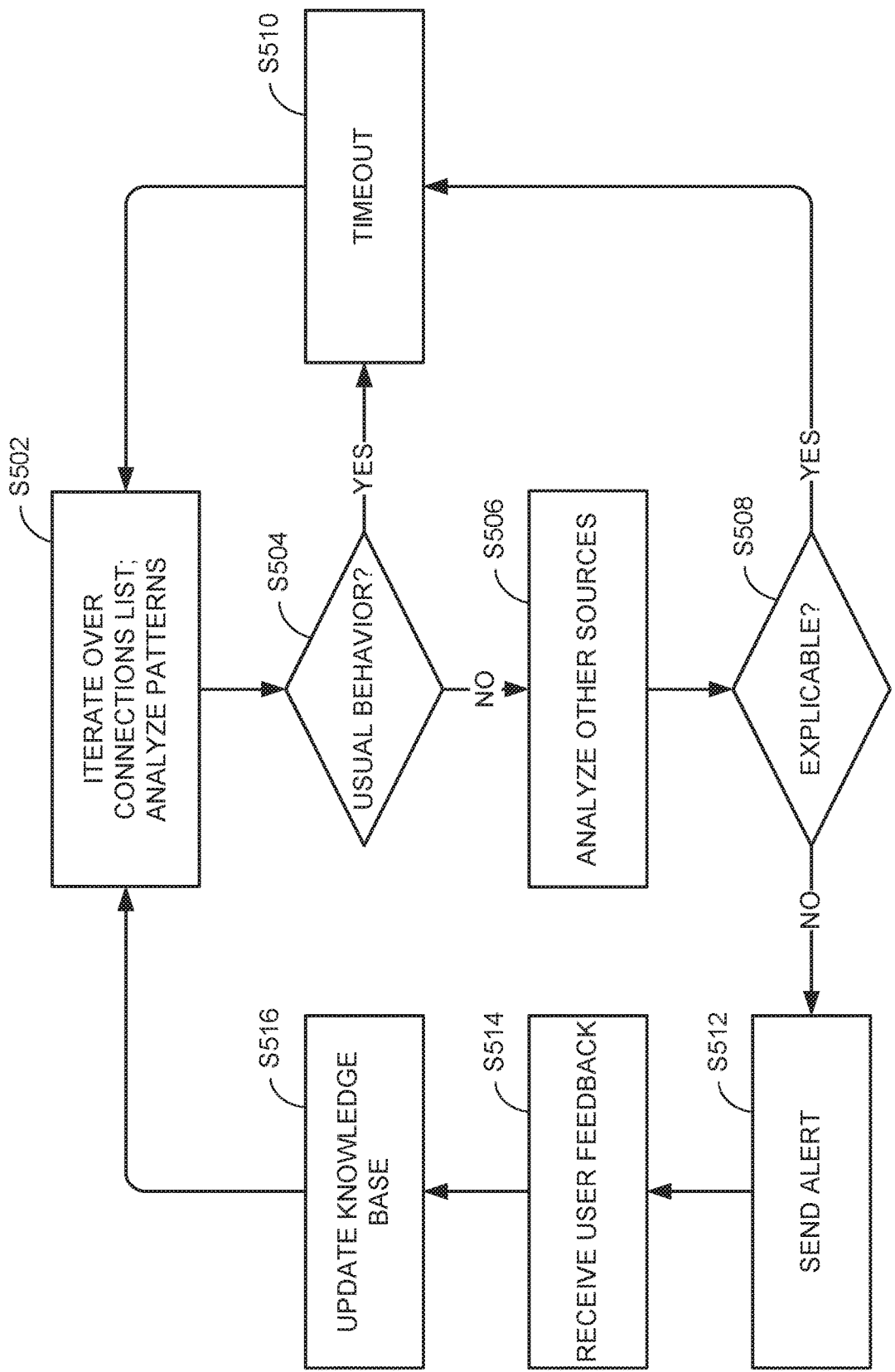
FIG. 5 is a flowchart depicting one example of a method, performed at least in part, by a system in accordance with at least one embodiment of the present invention.

Flowchart 500 of FIG. 5 depicts one example of a method, performed at least in part, by a system in accordance with at least one embodiment of the present invention. Flowchart 500 includes the following operations (with process flow among and between the operations as shown by arrows in FIG. 5): S502, S504, S506, S508, S510, S512, S514 and S516.

Some embodiments of the present invention may include one, or more, of the following features, characteristics and/or advantages: (i) creates a behavioral model of a single user taking into consideration interactions with other users; (ii) evaluates the evolution of this model over time to detect anomalies; (iii) analyzes multiple text messages (such as interactions of users in chats) to determine behavioral patterns; (iv) detects anomalies based on the evolution of the model; (v) leverages the content and types of user interactions; (vi) accesses real content of user interactions (as opposed to only metadata) and evaluates content of messages to prioritize and process them in a dynamic manner; (vii) directly assesses the status of a user through direct access to the person's communications across different channels; (viii) analyzes the user data to assess the user's general status and possible deviations from a "normal" status of the user's social relationship matrix; (ix) is centered on the user; (x) analyzes the user's relationships to assess the user status; (xi) analyzes the evolution of a user's behavior and mood; (xii) analyzes the "softer" aspect of a user behavior to discover deviations that can build up over time and searches for justifications to those deviations (if a suitable justification is found, the deviation is not even considered as such but is included, as an update, to the expected user behavior; (xiii) analyze user behavior to discover deviations; (xiv) recognizes unusual user behavior by analyzing user behavior on different channels, and that of other related or similar users; (xv); determines an expected behavior of a user, and compares the behavior to that of similar users (who may or may not have interactions with the user), to understand whether or not there is an acceptable explanation of a behavioral anomaly, thus learning a new pattern; (xvi) if there is no acceptable explanation, then the system triggers an alert that is sent to a configurable set of other users; (xvii) applies a cognitive system for real time evaluation of sentiment analysis in chat sessions, text messages and other online interactions; and/or (xviii) correlates old messages with new messages to detect deviation from an established pattern.

Some embodiments of the present invention make a decision regarding a user's behavior by considering the behavior of related users. Anomalies are detected by analyzing the behavior of a first user in relation to the behavior of others (for example, an affinity group) that do not necessarily have current interactions with the first user. Moreover, the system analyzes contents and interactions on multiple channels and uses sentiment analysis.

Some embodiments may not have these potential advantages and these potential advantages are not necessarily required of all embodiments.

Some embodiments of the present invention provide a method to advise a first user that a second user exhibits unusual behavior where the first user and the second user communicate, or are related through at least one channel (for example, e-mail, chat, social networking, calendars, GPS data etc.). The method comprises: Creating a knowledge base based on behavior of each user, grouping users having a similar behavior by collecting pattern data, from different medium channels, over a configurable period of time. Collecting in real time that is over a smaller period of time compared to the previous step, user behavior by collecting the corresponding behavior pattern data in the knowledge base. Comparing in real time if the behavior collected with the behavior expected from pattern data for the user in the knowledge base. If the behavior is an anomalous behavior compare with the number of users (threshold) in the same group having similar anomalous behavior if the number of users is sufficiently high do not advise the user of an anomalous behavior. If the anomalous behavior is not retrieved for a sufficient number of users in the same group having similar anomalous behavior analyzing changes in the different medium channels in other monitored variables characterizing events which could explain the behavior change in comparison with location and positioning data in the knowledge base for said user. If no event explaining advising that the user has an unusual behavior change. Update the knowledge base with the new collected values. Create temporary entries in the knowledge base if a feedback is received by/about the user.

FIG. 6 depicts a block diagram of components of one example of a computer 600 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

As depicted, the computer 600 includes communications fabric 602, which provides communications between computer processor(s) 604, memory 606, persistent storage 608, communications unit 612, and input/output (I/O) interface(s) 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media.

One or more programs may be stored in persistent storage 608 for access and/or execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links.

I/O interface(s) 614 allows for input and output of data with other devices that may be connected to computer 600. For example, I/O interface 614 may provide a connection to external devices 620 such as a keyboard, keypad, a touch screen, and/or some other suitable input device. External devices 620 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 608 via I/O interface(s) 614. I/O interface(s) 614 also connect to a display 622.

Display 622 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to optimal explain the principles of the embodiment, the practical application or technical improvement over technologies found in the marketplace, or to enable others of ordinary skill in the art to understand the embodiments disclosed herein.

What is claimed is:

1. A method comprising:
    receiving a user conduct pattern dataset, associated with a communication channel, including a user sentiment pattern, with respect to a user;
    determining the user is related to users of an affinity group through cognitive analysis of activities of the user on the communication channel;
    receiving an affinity group conduct pattern dataset, associated with the communication channel, including a group sentiment pattern, with respect to the affinity group;
    receiving a user current conduct dataset, associated with the communication channel, including a user current sentiment score, with respect to the user;
    receiving an affinity group current conduct dataset, associated with the communication channel, including a group current sentiment score, with respect to the affinity group;
    determining, based at least in part, on a first rate of change of the user current sentiment score and a second rate of change of the group current sentiment score: (i) the user current sentiment score does not match the user sentiment pattern and (ii) the group current sentiment score matches the group sentiment pattern;
    responsive to determining (i) the user current sentiment score does not match the user sentiment pattern and (ii) the group current sentiment score matches the group sentiment pattern, producing an alert comprising information authorized by a user-configured authorization database, the information including a change in posting frequency;
    identifying a designated recipient, based collectively on relationship status, and by analyzing: (i) interaction frequency and (ii) interaction duration between the user and the designated recipient;
    sending the alert to the designated recipient;
    responsive to sending the alert, receiving feedback from the designated recipient, wherein the feedback specifies that the change in posting frequency is explicable; and
    responsive to receiving the feedback from the designated recipient, modifying a parameter in the user conduct pattern dataset based on the feedback.

2. The method of claim 1, wherein the user conduct pattern dataset and the affinity group conduct pattern dataset comprise information indicating activities of the user and the affinity group, respectively, including a selection from the group consisting of: behavioral factors of the user, behavioral factors of the affinity group, sentiment analysis results of the user, and sentiment analysis results of the affinity group.

3. The method of claim 1, wherein:
    the user conduct pattern dataset and the affinity group conduct pattern dataset comprise information indicating activities of the user and activities of the affinity group performed over a first period of time that ends at a current time; and
    the user current conduct dataset and the affinity group current conduct dataset comprise information indicating activities of the user and activities of the affinity group performed over a second period of time, shorter than the first period of time, that ends at the current time.

4. The method of claim 1, wherein the affinity group is a group of users, members of which share a selection from the group consisting of: a common interest, a common behavioral pattern, and a common relationship to one another.

5. The method of claim 1, wherein the communication channel is selected from the group consisting of: online chat, social network interaction, email communication, telephone communication, file upload, file download, calendar entry, voice over internet protocol (VOIP) phone call communications, and text messaging.

6. A computer program product comprising:
    one or more computer readable storage media and program instructions collectively stored on the one or more computer readable storage media, the program instructions comprising program instructions to:
    receive a user conduct pattern dataset, associated with a communication channel, including a user sentiment pattern, with respect to a user;
    determine the user is related to users of an affinity group through cognitive analysis of activities of the user on the communication channel;
    receive an affinity group conduct pattern dataset, associated with the communication channel, including a group sentiment pattern, with respect to the affinity group;
    receive a user current conduct dataset, associated with the communication channel, including a user current sentiment score, with respect to the user;
    receive an affinity group current conduct dataset, associated with the communication channel, including a group current sentiment score, with respect to the affinity group;
    determine, based at least in part, on a first rate of change of the user current sentiment score and a second rate of change of the group current sentiment score: (i) the user current sentiment score does not match the user sentiment pattern and (ii) the group current sentiment score matches the group sentiment pattern;

responsive to determining (i) the user current sentiment score does not match the user sentiment pattern and (ii) the group current sentiment score matches the group sentiment pattern, produce an alert comprising information authorized by a user-configured authorization database, the information including a change in posting frequency;

identify a designated recipient, based collectively on relationship status, and by analyzing: (i) interaction frequency and (ii) interaction duration between the user and the designated recipient;

send the alert to the designated recipient;

responsive to sending the alert, receive feedback from the designated recipient, wherein the feedback specifies that the change in posting frequency is explicable; and responsive to receiving the feedback from the designated recipient, modify a parameter in the user conduct pattern dataset based on the feedback.

7. The computer program product of claim 6, wherein the user conduct pattern dataset and the affinity group conduct pattern dataset comprise information indicating activities of the user and the affinity group respectively, including a selection from the group consisting of: behavioral factors of the user, behavioral factors of the affinity group, sentiment analysis results of the user, and sentiment analysis results of the affinity group.

8. The computer program product of claim 6, wherein:
the user conduct pattern dataset and the affinity group conduct pattern dataset comprise information indicating activities of the user and activities of the affinity group performed over a first period of time that ends at a current time; and
the user current conduct dataset and the affinity group current conduct dataset comprise information indicating activities of the user and activities of the affinity group performed over a second period of time, shorter than the first period of time, that ends at the current time.

9. The computer program product of claim 6, wherein the affinity group is a group of users, members of which share a selection from the group consisting of: a common interest, a common behavioral pattern, and a common relationship to one another.

10. The computer program product of claim 6, wherein the communication channel is selected from the group consisting of: online chat, social network interaction, email communication, telephone communication, file upload, file download, calendar entry, voice over internet protocol (VOIP) phone call communications, and text messaging.

11. A computer system comprising:
one or more computer processors;
one or more computer-readable storage media;
program instructions stored on the computer-readable storage media for execution by at least one of the one or more processors, the program instructions comprising program instructions to:
receive a user conduct pattern dataset, associated with a communication channel, including a user sentiment pattern, with respect to a user;
determine the user is related to users of an affinity group through cognitive analysis of activities of the user on the communication channel;
receive an affinity group conduct pattern dataset, associated with the communication channel, including a group sentiment pattern, with respect to the affinity group;
receive a user current conduct dataset, associated with the communication channel, including a user current sentiment score, with respect to the user;
receive an affinity group current conduct dataset, associated with the communication channel, including a group current sentiment score, with respect to the affinity group;
determine, based at least in part, on a first rate of change of the user current sentiment score and a second rate of change of the group current sentiment score: (i) the user current sentiment score does not match the user sentiment pattern and (ii) the group current sentiment score matches the group sentiment pattern;
responsive to determining (i) the user current sentiment score does not match the user sentiment pattern and (ii) the group current sentiment score matches the group sentiment pattern, produce an alert comprising information authorized by a user-configured authorization database, the information including a change in posting frequency;
identify a designated recipient, based collectively on relationship status, and by analyzing: (i) interaction frequency and (ii) interaction duration between the user and the designated recipient;
send the alert to the designated recipient;
responsive to sending the alert, receive feedback from the designated recipient, wherein the feedback specifies that the change in posting frequency is explicable; and
responsive to receiving the feedback from the designated recipient, modify a parameter in the user conduct pattern dataset based on the feedback.

12. The computer system of claim 11, wherein the user conduct pattern dataset and the affinity group conduct pattern dataset comprise information indicating activities of the user and the affinity group respectively, including a selection from the group consisting of: behavioral factors of the user, behavioral factors of the affinity group, sentiment analysis results of the user, and sentiment analysis results of the affinity group.

13. The computer system of claim 11, wherein:
the user conduct pattern dataset and the affinity group conduct pattern dataset comprise information indicating activities of the user and activities of the affinity group performed over a first period of time that ends at a current time; and
the user current conduct dataset and the affinity group current conduct dataset comprise information indicating activities of the user and activities of the affinity group performed over a second period of time, shorter than the first period of time, that ends at the current time.

14. The computer system of claim 11, wherein the affinity group is a group of users, members of which share a selection from the group consisting of: a common interest, a common behavioral pattern, and a common relationship to one another.

15. The computer system of claim 11, wherein the communication channel is selected from the group consisting of: online chat, social network interaction, email communication, telephone communication, file upload, file download, calendar entry, voice over internet protocol (VOIP) phone call communications, and text messaging.

* * * * *